Patented Mar. 19, 1940

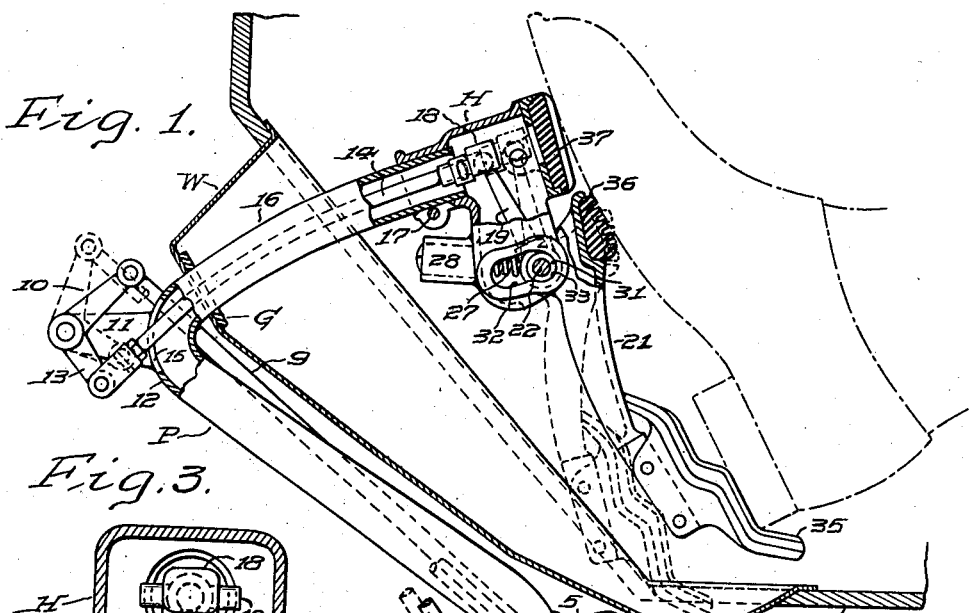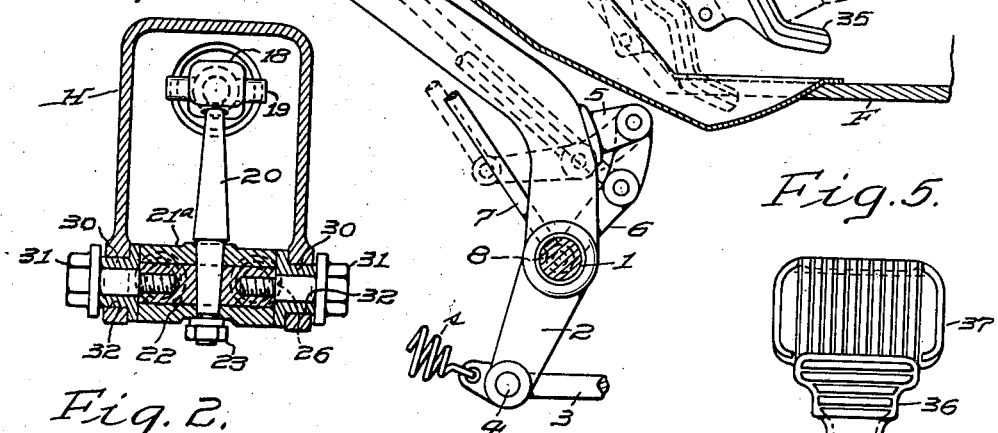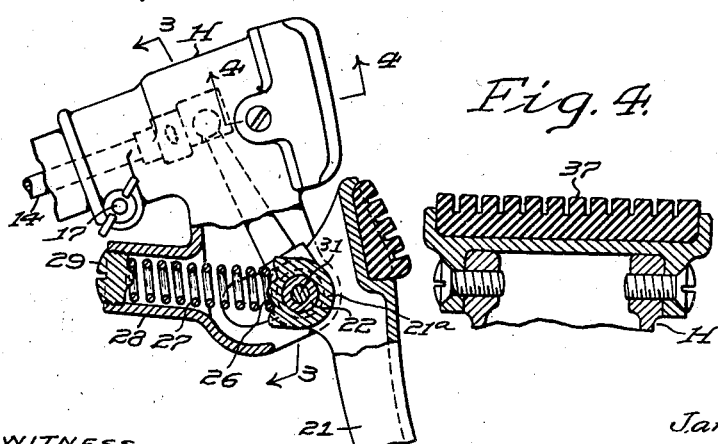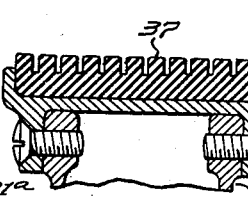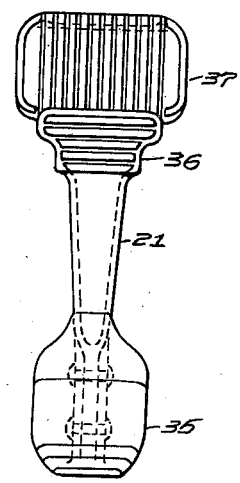

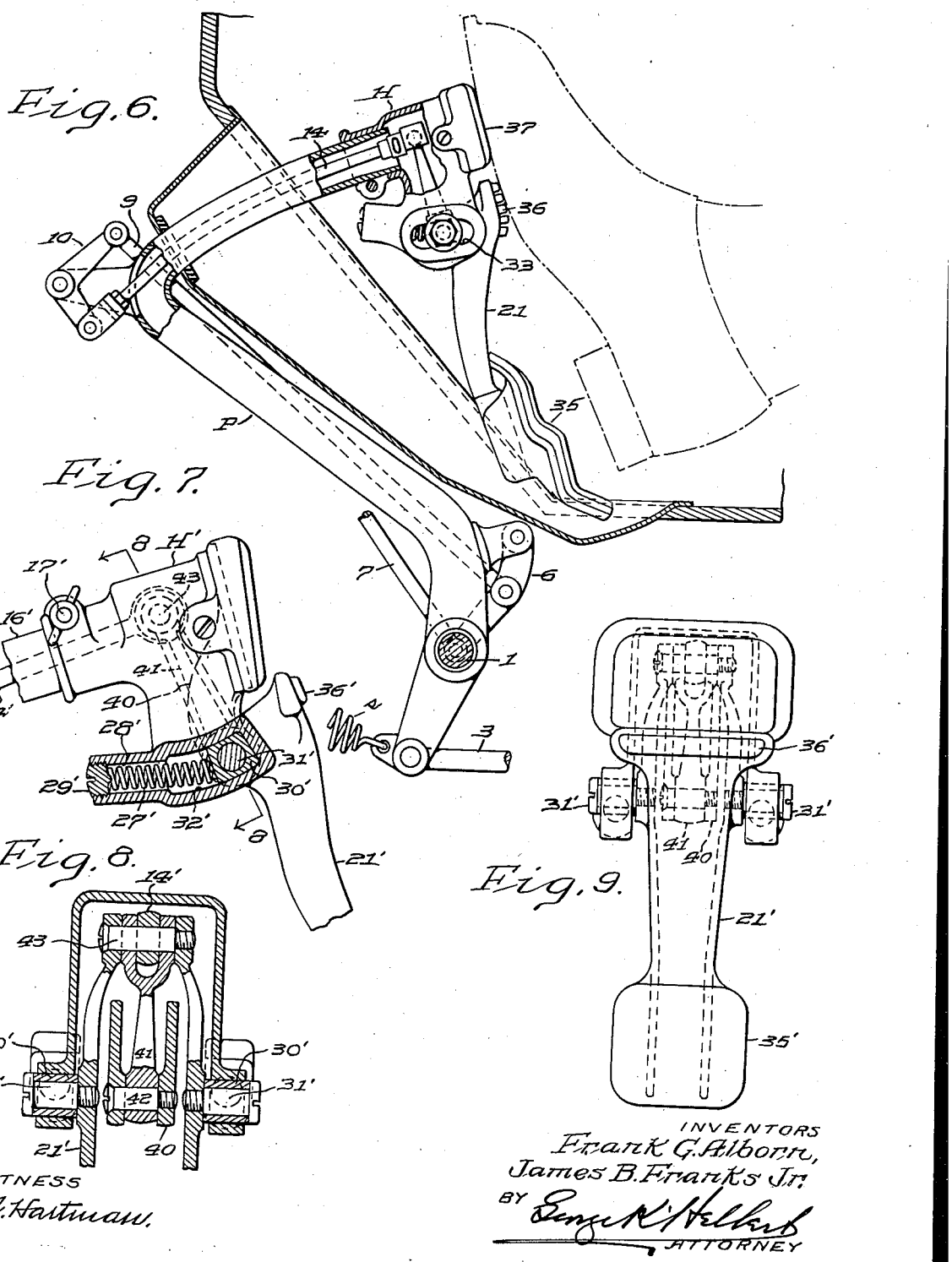

2,193,866

UNITED STATES PATENT OFFICE 2,193,866

MOTOR VEHICLE CONTROL MECHANISM

Frank G. Alborn, Norwalk, Conn., and James B. Franks, Jr., Philadelphia, Pa., assignors to Andrew R. McCown, Philadelphia, Pa., as trustee Application September 1, 1938, Serial No. 227,872

16 Claims. (Cl. 192—3)

This invention relates to mechanism for actuating control elements of motor vehicles, especially the brakes and the engine throttle, to provide maximum safety in operation and maximum physical comfort to the vehicle operator.

We have heretofore disclosed in our co-pending application for United States Letters Patent for Motor vehicle control mechanism, Serial No. 200,404, filed April 6, 1938, certain means adapted for this purpose and the present application constitutes a continuation in part thereof, the invention herein disclosed relating to improved vehicle control mechanism affording a greater feeling of stability for the operator's foot and consequently more restful operating conditions.

Thus a feature of the brake and accelerator operating means described in said application is that the accelerator pedal is pivoted on a movable fulcrum which is moved to render the accelerator pedal inoperative when the brakes are applied and restored to normal operating condition upon release of the brakes.

In accordance with the present invention we provide mechanism in which the accelerator pedal or corresponding part is similarly mounted on a movable fulcrum, but we employ improved means for rendering the accelerator pedal ineffective to actuate the throttle during brake operation whereby more rapid restoration of throttle control upon release of the brakes is attained together with other advantages which will hereinafter more fully appear.

Thus it is a principal object of the invention to provide motor vehicle control mechanism embodying an operator-operated part for actuating the brakes and another operator-operated part associated therewith for operating the throttle in combination with means placing the second of said parts in a condition inoperative to actuate the throttle when the first part is being operated for actuating the brakes.

A further object is to provide in means of the character described a unitary pedal having its throttle actuating lever mounted for pivotal movement on a fulcrum adapted to be moved relatively to the brake pedal when the latter is actuated, to thereby render the throttle lever substanially inoperative until subsequent release of the brake pedal and return of the throttle lever fulcrum to its normal position.

Still another object is the provision of a combined brake and accelerator pedal affording improved selective control of the brake and throttle respectively.

Other objects, purposes and advantages of the invention will hereinafter more fully appear or will be understood from the following description of certain of its embodiments wherein reference will be had to the accompanying drawings, in which, Fig. 1 is a side elevation partly in vertical section of a brake and accelerator pedal assembly constructed in accordance with the invention, the dotted line positions of the accelerator pedal and associated parts being those attained when the throttle is substantially fully open;

Fig. 2 is a somewhat enlarged fragmentary side elevation of the same mechanism with a different portion shown in vertical section, only the position of the accelerator pedal corresponding to a closed throttle being indicated;

Fig. 3 is a staggered section on the line 3—3 in Fig. 2;

Fig. 4 is a section on the line 4—4 in Fig. 2;

Fig. 5 is a front view on a reduced scale of the combined brake and accelerator pedal;

Fig. 6 is a view corresponding to Fig. 1 but showing the parts in position for application of the brakes in which position the accelerator pedal is therefore inoperative to actuate the throttle;

Fig. 7 is a view corresponding to Fig. 2 of a modified embodiment of the invention;

Fig. 8 is a section thereof on the line 8—8 in Fig. 7, and

Fig. 9 is a front view thereof corresponding to Fig. 5, but with internal construction illustrated in somewhat greater detail.

In the several figures like characters are used to designate the same parts.

In the mechanism described in our said co-pending application, Serial No. 200,404, the fulcrum about which the accelerator pedal or generally equivalent part swings for operating the throttle is moved relatively to the brake lever when the brakes are to be applied, which movement brings about an operative disconnection of the accelerator pedal from the throttle control mechanism. In accordance with the present invention, however, the accelerator pedal fulcrum is likewise movable, particularly during heavy application of the brakes but without producing operative disconnection of the accelerator pedal from the throttle control mechanism, such movement merely preventing operation of the throttle by the accelerator pedal which, upon its return movement, instantaneously resumes control over the throttle, while if desired the brakes may be applied without moving the accelerator pedal fulcrum.

Referring now more particularly to the drawings, the mechanism shown in Figs. 1–6, inclusive, comprises a pedal lever generally designated P supported from the usual brake pedal fulcrum pin 1 which is preferably fixed to a rigid vehicle frame part or the like. The lever P is formed with a projecting arm 2 to operate the brake rod 3 through a pin connection 4 during movement of the lever about fulcrum pin 1, and for added stability we may employ a spring s extending from arm 2 to any convenient point and supplementing the usual brake releasing spring (not shown). The head H of the pedal lever, hereinafter more fully described, thus moves about this fulcrum above the floor boards F, which are of usual construction except that they have let into them a supplementary sheet metal well W preferably carrying a gasket G for sealing the operator's compartment without restraining movement of the pedal.

Adjacent the fulcrum pin 1 on lever P is a lug 5 from which a pivoted lever 6 extends toward the fulcrum pin for connection with a throttle rod 7 through pivot pin 8 coaxial with fulcrum pin 1 when the throttle is closed. Lever 6 is operated by a second rod 9 connected to one arm of a crank 10 which is pivotally carried on a lug 11 adjacent the elbow 12 of the pedal lever; the other arm 13 of crank 10 has a pivotal connection with a rod 14 extending through a hole 15 in the hollow pedal lever offset 16 to head H of the pedal lever so that the throttle may be operated by moving rod 14 longitudinally with respect to the pedal lever.

This rod 14 is actuated by mechanism associated with pedal head H which is secured to the pedal offset by a clamp screw 17, but any other suitable specific arrangement of the head may be employed and our invention is thus chiefly concerned with the mechanism disposed adjacent head H and controlling the operation of the parts heretofore mentioned, which may be of any desired form or construction adapted to be operated by the means now to be described.

In accordance with the present invention throttle rod 14 is connected at its end within pedal head H with a ball and socket joint 18 from which extend laterally outwardly integral projections 19 constituting stops adapted to engage the adjacent end of offset 16 to limit movement of the rod in one direction. A tapered arm 20 extends downwardly from the joint 18 and its lower tapered end is fitted into a hub 21a forming a part of accelerator pedal lever 21, and extends through a shaft 22 within the hub from which the lever is supported, the arm being secured to these parts by a nut 23 threaded onto its end.

Hub 21a, which is integral with the accelerator lever 21, is provided on one side adjacent its ends with annular grooves 26 for the reception of the ends of compression springs 27 fitted into sleeves 28 formed in head H and secured therein by threaded caps 29 whereby springs 27 continually urge hub 21a and hence shaft 22, which forms the accelerator pedal fulcrum, toward the right in Fig. 2. The shaft 22 is movably secured within the head by means of flanged bushings 30 secured to its ends by cap screws 31, the cylindrical parts of the bushings being slidable in slots 32 formed in the sides of the head H. Slots 32 throughout the major portion of their length are drawn on arcs coaxial with each other and with the points of engagement of the stops 19 with the end of the offset 16, these stops effecting such engagement when the accelerator pedal is in the position shown in full lines in Fig. 1, that is when the throttle is closed and the brakes released. At their outer ends, however, the slots are provided with small dwells 33 for a purpose which will hereinafter appear.

The accelerator lever or pedal 21 carries two pads, one of which, pad 35, is adapted for reception of the operator's heel to enable him to swing the pedal about the shaft 22 for actuating the throttle while the other pad 36 at the upper end of pedal 21 intercepts the ball of the operator's foot during application of the brakes and when moved thereby causes shaft 22 to move inwardly on bushings 30 which rise out of their dwells 33 upon the exertion of material pressure on pad 36, causing the accelerator pedal to move pivotally about the points of engagement of the stops 19 with the end of the offset 16 and carry pad 35 rapidly inwardly away from the operator's heel, as shown in Fig. 3, thereby preventing operation of the throttle during application of the brakes.

This movement, which thus results automatically from the pressure of the foot against upper pad 36 of the accelerator pedal as the foot is brought to bear on the fixed brake pad 37 to operate the brakes, takes place substantially instantaneously, and as shaft 22 is much nearer to the axis about which it moves than to pad 35 on the accelerator pedal, the pad moves relatively to pedal head H considerably farther than the shaft and at a greater speed so that it moves out of reach of the operator's heel before the ball of his foot can exert sufficient pressure against the brake pad to move the pedal as a whole for applying the brakes, and inadvertent operation of the accelerator pedal during braking is thus rendered substantially impossible.

Immediately upon release of the brakes, however, the accelerator pedal is restored to condition for operating the throttle by return of shaft 22 to its normal position through the action of springs 27, this action also returning bushings 30 to the dwells 33, and they thereafter releasably hold the accelerator pedal fulcrum in this position until it is again positively moved prior to application of the brakes. We consider dwells 33 desirable in this embodiment of the invention because the resistance they offer to movement of the accelerator pedal fulcrum prevents its being shifted inadvertently, but they may be omitted if preferred and the fulcrum held in position merely by the pressure of springs 27.

In the form of the invention shown in Figs. 7–9, inclusive, a somewhat different arrangement of the mechanism inhibits movement of the accelerator pedal fulcrum during throttle operation, but in this mechanism the accelerator pedal fulcrum is supported in a somewhat different manner, that is, head H' of the pedal, secured to pedal offset 16' by a clamp screw 17', carries a fixed pad 37' which supports a pair of brackets 40 carrying a throttle rod supporting arm 41 on a pivot pin 42. The inner end of throttle rod 14' is pivoted to the upper end of arm 41 on a pin 43 and the rod is thus constrained to move solely about the axis of pivot pin 42. Accelerator pedal lever 21', mounted on a movable fulcrum as hereinafter more fully described, is also pivoted to throttle rod 14' on pin 43, and it is consequently only when the accelerator pedal fulcrum is positioned substantially coaxially with pivot pin 42 that accelerator pedal 21' is effective to operate the throttle rod.

The movable fulcrum on which the accelerator pedal is mounted comprises screws 31' threaded into opposite sides of the pedal lever and pivotally carried in blocks 30' slidable in arcuate slots 32' formed in the sides of the pedal head. Springs 27' held under compression in head sleeves 28' through the medium of threaded caps 29' urge the blocks toward or retain them at the outer extremity of their travel in the slots and thus yieldingly maintain the accelerator pedal lever fulcrum coaxial with pivot pin 42 except when it is positively moved therefrom during braking.

At the initiation of the latter operation, however, this fulcrum is shifted against the force of springs 27' through pressure of the ball of the operator's foot against upper pad 36', moving the fulcrum out of coaxial relation with pivot pin 42 to render the accelerator pedal ineffective to operate throttle rod 14', lower pad 35' simultaneously moving out of reach of the operator's heel so as to offer no obstruction to normal braking operation.

On release of the braking pressure of the operator's foot and consequent removal of heavy pressure from upper pad 36' of the accelerator pedal, spring 27' instantly restore the accelerator pedal fulcrum to its former coaxial relation with pin 42 and the throttle can thereafter be operated in the usual way by pressure of the operator's heel against lower pad 35', now returned to a readily accessible position.

The mechanism shown in Figs. 7-9, inclusive, will of course be understood as fragmentarily indicating only certain parts of the brake and throttle control mechanism as a whole, the remaining parts of which may be substantially similar to those shown by way of illustration in Figs. 1 and 6 or may be of any other suitable or desired character, as mechanism constructed in accordance with our invention may be utilized for controlling brake and throttle operating devices of many different specific kinds, and is not limited to control solely of parts arranged as herein shown and described.

Moreover while we have herein explained with considerable particularity the construction and operation of certain embodiments of the invention which have been selected for purposes of illustration in association and combination with more or less standard brake and throttle operating elements adapted to be controlled thereby, it will be understood that we do not desire or intend to limit or confine ourselves thereto in any way as other changes and modifications in the form, construction and relationship of the various parts will readily occur to those skilled in the art and may be made if desired without departing from the spirit and scope of the invention as defined in the appended claims.

Having thus described our invention, we claim and desire to protect by Letters Patent of the United States:

1. In mechanism of the character described, a brake pedal, an accelerator pedal, a movable fulcrum for the accelerator pedal carried by the brake pedal, and means associated with the brake pedal for moving said fulcrum prior to application of the brakes by pressure of the operator's foot on the brake pedal.

2. Automotive vehicle brake and throttle control mechanism comprising a brake lever having a relatively fixed fulcrum, an accelerator lever carried by said brake lever having a fulcrum movable relatively thereto, means connecting said accelerator lever for controlling the throttle, and means for moving said accelerator fulcrum relatively to said brake lever upon application of pressure to the brake lever for moving it about its fulcrum in controlling the brakes.

3. Automotive vehicle brake and throttle control mechanism comprising a brake lever having connection with the brakes and movable about a relatively fixed fulcrum, a second lever having connection with throttle actuating means and movable about a fulcrum spaced from and movable relatively to said fixed fulcrum in an arcuate path coaxial with said connection when the throttle is closed, and means for moving the second fulcrum in said path relatively to the first fulcrum prior to movement of the first lever about the first fulcrum for applying the brakes.

4. In combination with a movable brake pedal adapted to operate the brakes of an automotive vehicle, throttle actuating means carried by the pedal, an accelerator lever adapted for movement about a fulcrum to operate said throttle actuating means, and means for moving the accelerator lever fulcrum about the axis of the connection of said lever with the throttle actuating means when the throttle is closed prior to operation of the brake pedal for applying the brakes.

5. In automotive vehicle brake and throttle control mechanism, a brake lever movable about a relatively fixed fulcrum, an accelerator lever for controlling the throttle movable about a fulcrum which is movable relatively to the brake lever fulcrum, means supporting the accelerator lever from the brake lever adapted during operation of the accelerator lever in controlling the throttle to maintain said fulcrum substantially fixed relatively to the brake lever fulcrum and means operable prior to movement of the brake lever on its fulcrum for moving the accelerator lever fulcrum relatively to the brake lever fulcrum to thereby render the accelerator lever inoperative to control the throttle.

6. In automotive vehicle brake and throttle control mechanism, a brake lever, a throttle controlling accelerator lever, a fulcrum for the accelerator lever about which said lever is movable relatively to the brake lever, and means carried by the brake lever for supporting said fulcrum for movement relatively thereto.

7. In combination with a fulcrumed brake pedal having throttle operating means associated therewith, an operator-operated part carried by the pedal for moving it about its fulcrum, a fulcrumed accelerator pedal connected with said throttle operating means, a second operator-operated part carried by the accelerator pedal adjacent said first operator-operated part operable to move the accelerator pedal fulcrum relatively to said brake pedal to thereby swing the accelerator pedal relatively to the brake pedal and to said throttle operating means.

8. In combined brake and throttle control mechanism, a brake lever, a throttle lever, a fulcrum for the throttle lever about which said lever is relatively movable with respect to the brake lever, and means for supporting said fulcrum for movement in an arcuate path about an axis fixed with respect to the brake lever whereby during application of pressure to the throttle lever in the normal actuation of the throttle said fulcrum remains substantially fixed with respect to the brake lever and upon application of force to the brake lever to apply the brakes the fulcrum may move about said axis relatively to the brake lever.

9. In mechanism of the character described, a brake pedal head, throttle operating means movable relatively thereto, an accelerator pedal pivotally connected with said means, means supporting the accelerator pedal for pivotal movement relatively to the head to move said throttle operating means relatively thereto, said pedal comprising operator-operated parts respectively adapted to move the pedal supporting means pivotally with respect to said throttle operating means and to move the accelerator pedal pivotally with respect to the head to thereby move the throttle operating means relatively thereto.

10. In automotive vehicle brake and throttle control mechanism, a brake pedal head, an accelerator lever, movable means pivotally supporting the lever from the head and means for maintaining the supporting means in substantially fixed position relatively to the head during control of the throttle by the lever.

11. In automotive vehicle brake and throttle control mechanism, a brake lever, a throttle controlling accelerator lever, a fulcrum for the accelerator lever about which said lever is movable relatively to the brake lever, means for supporting said fulcrum for movement about an axis fixed relatively to the brake lever during application of the brakes, and means for maintaining said fulcrum substantially fixed relatively to the brake lever during operation of the accelerator lever for controlling the throttle.

12. In automotive vehicle brake and throttle control mechanism, a brake pedal movable about a fixed fulcrum for operating the brakes, an accelerator pedal carried by the brake pedal for operating the throttle, means supporting the accelerator pedal from the brake pedal for pivotal movement relatively thereto during throttle operation, said means affording a fulcrum movable relatively to the brake pedal, yielding means resisting movement of the fulcrum in one direction, and means for moving said fulcrum in opposition to said yielding means when the brake pedal is operated to apply the brakes.

13. In automotive vehicle brake and throttle control mechanism, a brake pedal, an accelerator pedal lever, means for supporting the lever for pivotal movement relatively to the brake pedal, means for moving said lever supporting means about an axis fixed relatively to the pedal, and yielding means maintaining said supporting means in fixed position relatively to the pedal during throttle control by said lever.

14. In automotive vehicle brake and throttle control mechanism, a brake pedal lever, throttle actuating means movable relatively thereto, an accelerator lever pivoted to said means, means supporting the accelerator lever for pivotal movement relatively to the brake pedal lever to control said actuating means, the axis of said pivotal movement being movable about the axis of the pivotal connection between the lever and said actuating means, and means operative to maintain said first mentioned axis relatively fixed with respect to the brake pedal lever during control of said actuating means by the accelerator lever.

15. In combination with a brake pedal having throttle operating means movable relatively thereto, a pivoted arm carried by the pedal and pivotally connected to said means, an accelerator lever pivoted to the arm and said means coaxially with the pivotal connection therebetween, means supporting the lever for pivotal movement relatively to the pedal on a fulcrum movable into and out of coaxial relation with the pivot supporting the arm from the pedal, and means for moving the lever and said supporting means about the pivotal connection between the arm and the lever during braking operation of the pedal.

16. Automotive vehicle brake and throttle control mechanism comprising a brake lever having connection with the brakes and movable about a relatively fixed fulcrum, an accelerator lever having connection with throttle actuating means and movable about a fulcrum spaced from and movable relatively to the brake lever fulcrum, means for moving the accelerator lever fulcrum relatively to the brake lever fulcrum in an arcuate path coaxial with said connection of the accelerator lever with throttle actuating means when the throttle is closed, and yielding means urging said accelerator lever fulcrum in one direction relatively to the brake lever fulcrum.

FRANK G. ALBORN.
JAMES B. FRANKS, Jr.